United States Patent
Yang (10) Patent No.: US 6,727,961 B2
(45) Date of Patent: Apr. 27, 2004

(54) LIQUID CRYSTAL DISPLAYER ASSEMBLY AND FOLDABLE SUPPORT FRAME THEREFOR

(75) Inventor: Rowell Yang, Yungho (TW)

(73) Assignee: Proview Electronics Co., Ltd., Yungho (TW)

( * ) Notice: Subject to any disclaimer, the term of this patent is extended or adjusted under 35 U.S.C. 154(b) by 141 days.

(21) Appl. No.: 10/174,056

(22) Filed: Jun. 17, 2002

(65) Prior Publication Data

US 2003/0174259 A1 Sep. 18, 2003

(30) Foreign Application Priority Data

Mar. 12, 2002 (TW) ...................... 91202878 U (51) Int. Cl.⁷ .............. G02F 1/13; A47G 29/00
(52) U.S. Cl. .................... 349/58; 248/917
(58) Field of Search ............. 349/58, 60; 361/681; 248/121, 122.1, 125.7, 125.9, 371, 917, 919, 92

(56) References Cited

U.S. PATENT DOCUMENTS 6,502,792 B1 * 1/2003 Cho et al. .............. 248/121
2003/0095215 A1 * 5/2003 Huang .................... 349/58

* cited by examiner

*Primary Examiner*—Toan Ton
*Assistant Examiner*—Tai Duong
(74) *Attorney, Agent, or Firm*—Christie, Parker & Hale, LLP (57) ABSTRACT

In an LCD assembly, a foldable support frame includes an upright stand member with one end pivoted to a base member and another end pivoted to a rear side wall of an LCD unit. A positioning unit is mounted on the stand member, and engages releasably the base member for positioning the base member at an unfolded position relative to the stand member. The positioning unit is operable for disengaging from the base member so as to permit turning of the base member for folding on the stand member. The stand member is turnable forwardly for folding on the LCD unit.

20 Claims, 7 Drawing Sheets

LIQUID CRYSTAL DISPLAYER ASSEMBLY AND FOLDABLE SUPPORT FRAME THEREFOR

CROSS-REFERENCE TO RELATED APPLICATION

This application claims priority of Taiwanese application No. 091202878, filed on Mar. 12, 2002.

BACKGROUND OF THE INVENTION

1. Field of the Invention

The present invention relates to a liquid crystal displayer (LCD) assembly with a foldable support frame for reducing the storage space and packaging volume of the LCD assembly to facilitate storage and transport of the LCD assembly.

2. Description of the Related Art

Figure 1:
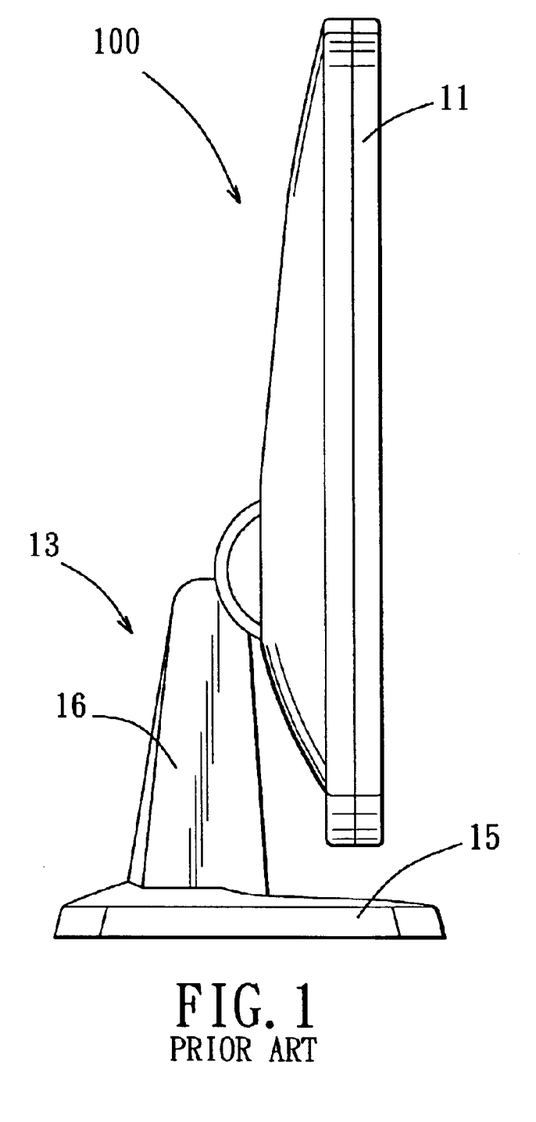
FIG. 1 is a side view of a conventional liquid crystal displaying assembly.

FIG. 1 illustrates a conventional liquid crystal displayer (LCD) assembly 100 which includes an LCD unit 11 and a support frame 13 for supporting the LCD unit 11. The support frame 13 includes a base plate 15 to be disposed on a table top (not shown), and an upright post 16 with one end secured to the base plate 15 and another end pivoted to a rear side wall of a casing of the LCD unit 11 to permit adjustment in angular orientation of the LCD unit 11 relative to the support frame 13. Since the post 16 is secured to the base plate 15, and since the base plate 15 has a size which is large enough to support the LCD unit 11 on the table top, the LCD assembly 100 occupies a relatively large volume when it is packed for the purpose of transport or storage. This undesirably increases the packaging and transport costs.

SUMMARY OF THE INVENTION

Therefore, the main object of the present invention is to provide a liquid crystal displayer assembly with a foldable support frame for reducing the storage space and packaging volume of the LCD assembly to facilitate storage and transport of the same.

Accordingly, the liquid crystal displayer assembly of the present invention includes a liquid crystal displayer (LCD) unit having a casing with a rear side wall, and a support frame for supporting the LCD unit. The support frame includes a base member, an upright stand member, and a positioning unit. The base member has front and rear ends and top and bottom surfaces. The stand member has a lower end connected pivotally to the rear end of the base member such that the base member is pivotable relative to the stand member about a horizontal lower pivot axis. The stand member further has an upper end mounted pivotally on the rear side wall of the LCD unit so as to be pivotable about a horizontal upper pivot axis relative to the LCD unit. The stand member has a front side surface and a rear side surface opposite to the front side surface. The positioning unit is mounted on the stand member, and engages releasably the base member for positioning the base member at an unfolded position relative to the stand member. The base member and the stand member define a predetermined angle when the base member is in the unfolded position. The positioning unit is operable for disengaging from the base member so as to permit the base member to turn about the lower pivot axis in a first direction, in which the base member is moved away from the front side surface of the stand member and proximate to the rear side surface of the stand member so as to be folded on the rear side surface of the stand member. The stand member is turnable about the upper pivot axis for moving proximate to the rear side wall of the LCD unit so as to be folded on the LCD unit.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figures 2, 2A:
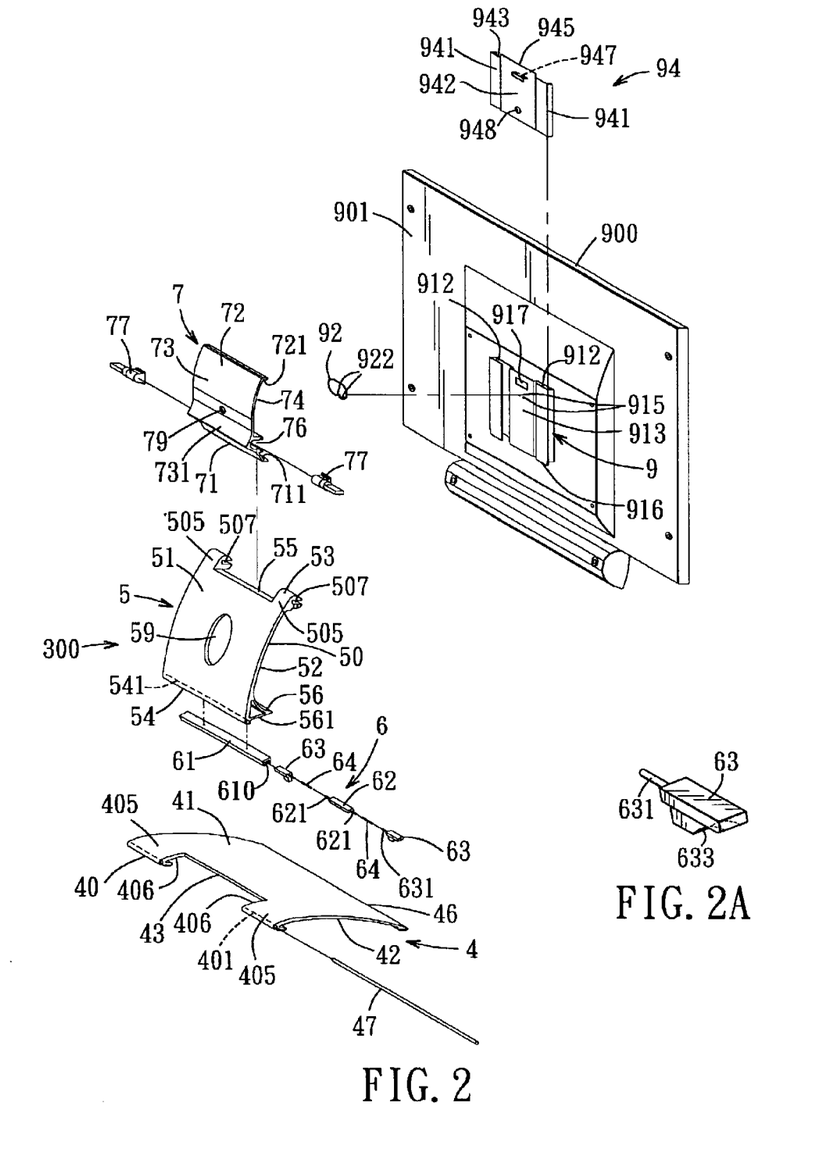
FIG. 2 is an exploded perspective view of a preferred embodiment of the LCD assembly of the present invention.
FIG. 2A is a magnified perspective view of an engaging block of the preferred embodiment.
Figure 3:
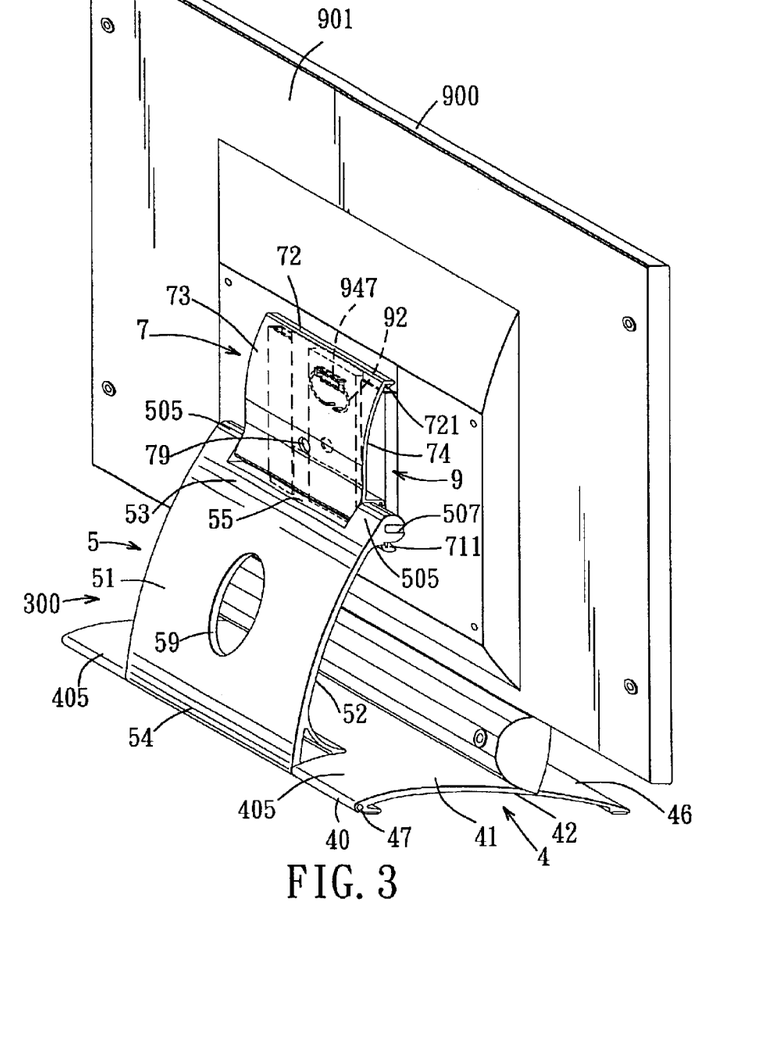
FIG. 3 is a perspective view of the preferred embodiment, viewed from a rear side.

Referring to FIGS. 2 and 3, the preferred embodiment of the liquid crystal displayer (LCD) assembly of this invention is shown to include a liquid crystal displayer (LCD) unit 900 and a support frame 300 for supporting the LCD unit 900, such as on a table top (not shown). The support frame 300 is shown to generally include a base member 4, an upright stand member 5, first and second mounting plates 7, 9, and a retaining plate 94.

Figure 4:
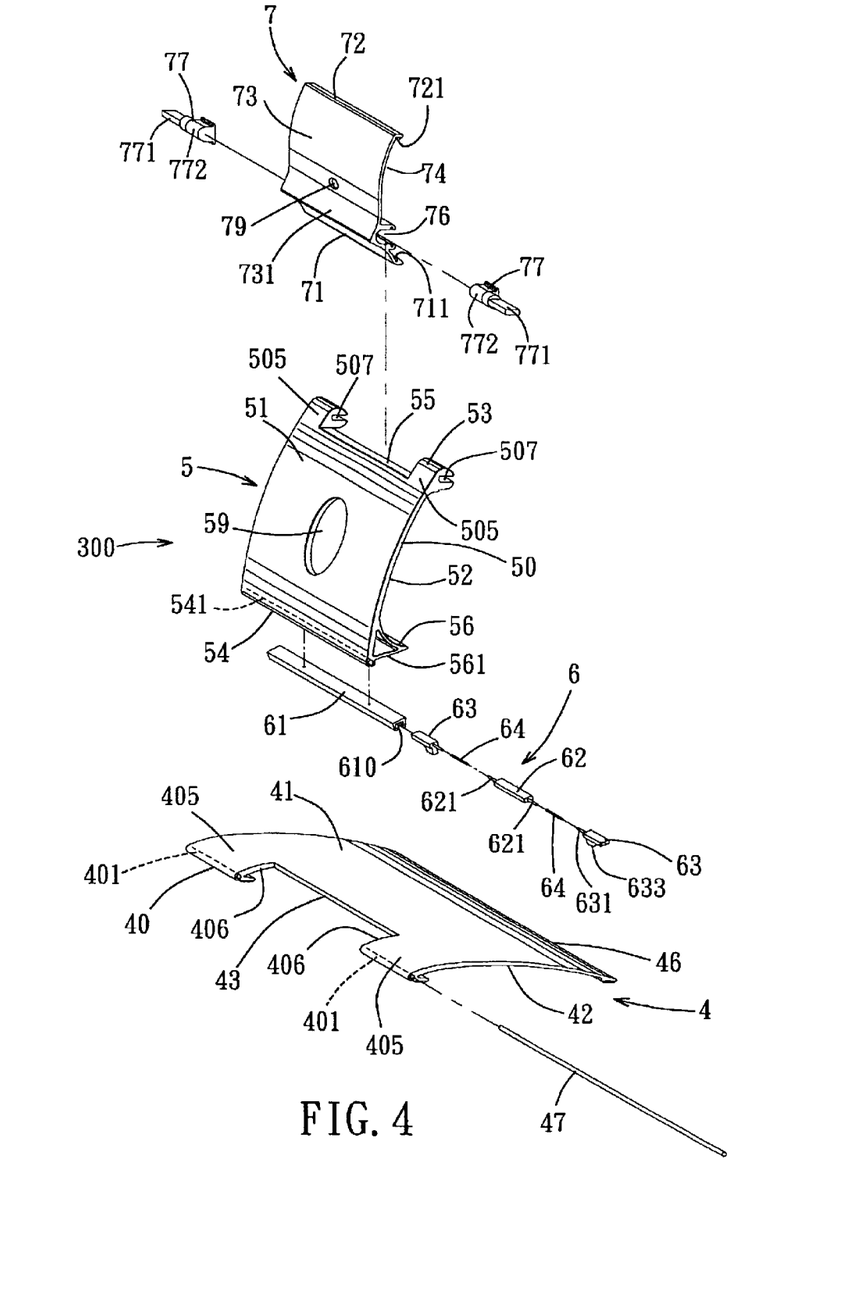
FIG. 4 is an exploded perspective view illustrating a base member, a stand member and a first mounting plate of a support frame of the preferred embodiment.

Referring to FIG. 4, the base member 4 is in the form of a generally rectangular curved plate with a convex top surface 41, a concave bottom surface 42, a front end 46, and a rear end 40 which is formed with a rectangular first notch 43 so as to define a pair of first pivot lobes 405 on opposite sides of the first notch 43. The first pivot lobes 405 are formed with aligned pivot holes 401 which extend along a common horizontal lower pivot axis.

The stand member 5 includes a curved plate portion 50 with a convex rear side surface 51, and a concave front side surface 52, and has a curvature generally corresponding with that of the base member 4. An abutment projection 56 projects forwardly from a lower end 54 and from the front side surface 52 of the curved plate portion 50. The abutment projection 56 has a bottom surface 561. The stand member 5 further has an upper end 53 formed with a generally rectangular second notch 55 so as to define a pair of second pivot lobes 505 on opposite sides of the second notch 55 at the upper end 53. The second pivot lobes 505 are formed with aligned pin slots 507 which open forwardly. The stand member 5 has a cable hole 59 formed through the curved plate portion 50 to permit extension of the LCD cable unit (not shown) therethrough. The lower end 54 of the curved plate portion 50 extends into the first notch 43 in the rear end 40 of the base member 4 and is formed with a pivot hole 541 that extends between left and right edges of the curved plate portion 50 and that is aligned with the pivot holes 401 in the base member 4 along a horizontal lower pivot axis. A pivot axle 47 extends along the lower pivot axis and through the pivot holes 401, 541 for connecting the base member 4 pivotally to the stand member 5. The abutment projection 56 has a size larger than that of the first notch 43 such that the abutment projection 56 cannot be received in the first notch 43 and such that the bottom surface 561 of a front edge portion of the abutment projection 56 abuts against the top surface 41 of the base member 4.

The positioning unit 6 includes an elongated slide rail 61 secured to the bottom surface 561 of the abutment projection 56. The slide rail 61 has a length not longer than that of the first notch 43 in a direction parallel to the pivot axle 47, and is extendible through the first notch 43. The slide rail 61 is formed with a downwardly opening slide channel 610 which is parallel to the pivot axle 47 and which has two opposite open ends that are disposed respectively adjacent to the pivot lobes 405 of the base member 4 when the slide rail 61 extends into the first notch 43. The slide channel 610 receives a pair of engaging blocks 63, a pair of biasing springs 64 and a spring seat 62 therein. The engaging blocks 63 are disposed adjacent to the open ends of the slide channel 610. Each of the engaging blocks 63 has a tapered wall 633 formed at an outer end thereof, and a pin projection 631 formed at an inner end and extending generally along an axis of the slide channel 610, as best shown in FIG. 2A. The spring seat 62 generally includes a rectangular block with two opposite ends, each formed with a pin projection 621. Each of the biasing springs 64 is in the form of a coiled compression spring, and is disposed between the spring seat 62 and a respective one of the engaging blocks 63. Each of the biasing springs 64 is sleeved on a respective one of the pin projections 621 on the spring seat 62 and on the pin projection 631 of an adjacent one of the engaging blocks 63. The biasing springs 64 bias the engaging blocks 63 to move outwardly of the slide channel 610 such that the engaging blocks 63 project from the open ends of the slide channel 610. Retaining means are provided on the slide rail 61 to prevent removal of the engaging blocks 63 from the open ends of the slide rail 61.

The first mounting plate 7 is slightly curved, and has a slightly convex rear side surface 73, a slightly concave front side surface 74, a hooked upper end 72 formed with a forward hook projection 721, a hooked lower end 71 formed with a forward hook projection 711, and a pivot portion 731 projecting from the rear side surface 73 and formed with a horizontally extending pivot groove 76 that opens on the front side surface 74. The pivot portion 731 extends into the second notch 55 in the stand member 5 such that the pivot groove 76 is aligned with the pivot slots 507 along a horizontal upper pivot axis parallel to the lower pivot axis. A pivot pin unit includes a pair of pivot pins 77 which extend along the upper pivot axis. Each of the pivot pins 77 has a flat section 771 received fittingly and non-rotatably in the pin slot 705 in a respective one of the second pivot lobes 505 of the stand member 5, and a rounded section 772 connected to the flat section 771 and extending rotatably into the pivot groove 76 for mounting the stand member 5 pivotally on the first mounting plate 7. The rounded sections 772 of the pivot pins 77 engage frictionally an inner wall surface of the pivot groove 76 such that the stand member 5 can be retained frictionally at a selected angular position relative to the first mounting plate 7. An access hole 79, which will be described later, is formed through the first mounting plate 7 above the pivot portion 731.

Figure 5:
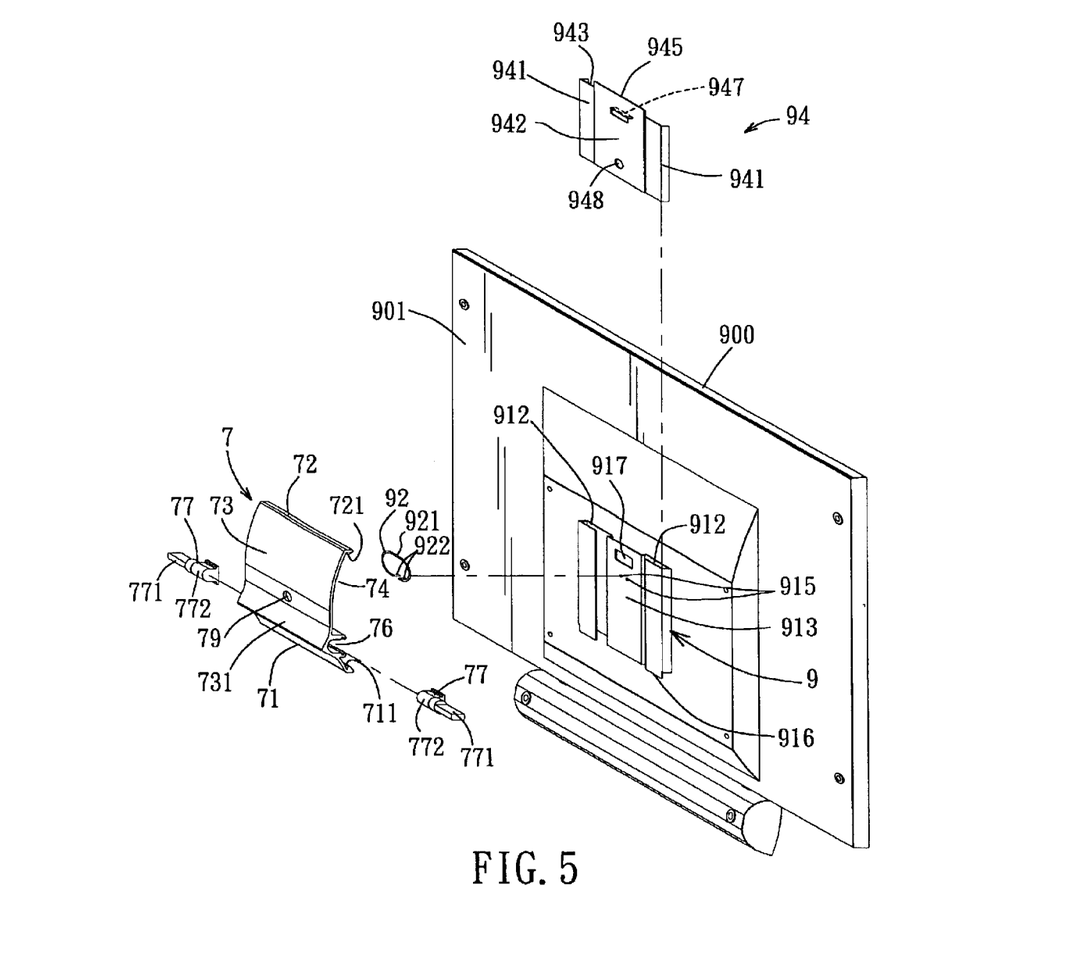
FIG. 5 is an exploded perspective view illustrating how the support frame is mounted on an LCD unit.

Referring to FIG. 5, a second mounting plate 9 is attached securely to a rear side wall 901 of a casing of the LCD unit 900. The second mounting plate 9 is configured to form a pair of slide grooves 912 at left and right end portions thereof, and a bulging portion 913 between the left and right end portions. Each of the slide grooves 912 extends from an upper end to a lower end 916 of the second mounting plate 9, and has a top opening. The bulging portion 913 is formed with a limiting slot 917, and a pair of spring retaining bores 915 below the limiting slot 917.

The retaining plate 94 has a pair of sliding plate portions 941 extending slidably and respectively into the slide grooves 912 via the top openings in the latter, and an intermediate portion 942 between the sliding plate portions 941. The intermediate portion 942 is disposed posteriorly of the bulging portion 913 of the second mounting plate 9, and is formed with a limiting protrusion 947 which projects forwardly and which extends into the limiting slot 917 to limit sliding movement of the retaining plate 94 relative to the second mounting plate 9 along the slide grooves 912.

A biasing member 92 is disposed between the intermediate portion 942 of the retaining plate 94 and the bulging portion 913 of the second mounting plate 9 and below the limiting protrusion 947. The biasing member 92 is in the form of a resilient ring that is formed by bending an elongated rod and that has two legs 922 at a lower part, and a ring portion 921 at an upper part and interconnecting the legs 922. The legs 922 are retained respectively in the spring retaining bores 915 in the second mounting plate 91. The ring portion 921 abuts against the limiting protrusion 947 to bias the retaining plate 94 upwardly such that an upper edge 945 of the retaining plate 94 projects upwardly relative to the second mounting plate 91.

When the first mounting plate 7 is to be mounted on the second mounting plate 9 for mounting on the rear sidewall 901 of the LCD unit 9, the lower hook projection 711 of the first mounting plate 7 is hooked at the lower end 916 of the second mounting plate 9. Then, the upper end 72 of first mounting plate 7 is moved proximate to the retaining plate 94 so as to enable a tapered face 722 (see FIG. 6) on the hook projection 721 to slide past the upper edge 945 of the retaining plate 94. At this time, the retaining plate 94 is pushed downwardly to compress the biasing member 92, and then springs upwardly to engage the hook projection 721 due to the upward restoring action applied by the biasing member 92. On the other hand, when it is desired to detach the first mounting plate 7 from the second mounting plate 9, a tool is extended through the access hole 79 in the first mounting plate 7 and into an operating hole 948 formed in the retaining plate 94, and is operated to move the retaining plate 94 downwardly so as to disengage the retaining plate 94 from the hooked upper end 72 of the first mounting plate 7. The first mounting plate 7 can then be removed from the second mounting plate 91.

Figure 6:
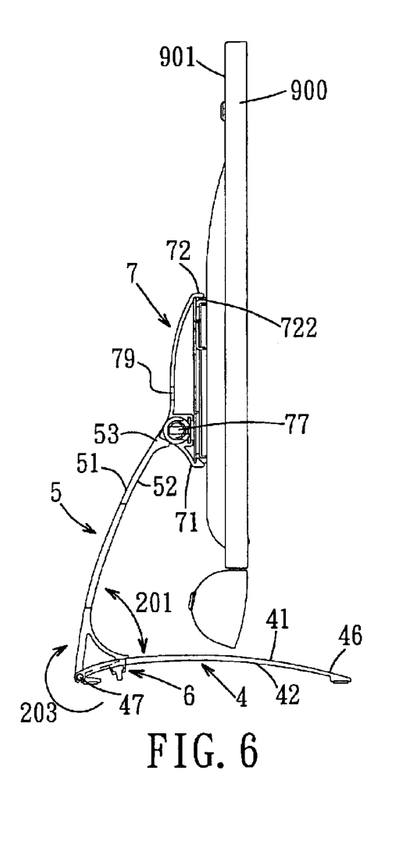
FIG. 6 is a side view of the preferred embodiment, where the support frame is shown to be in an unfolded state.
Figure 7:
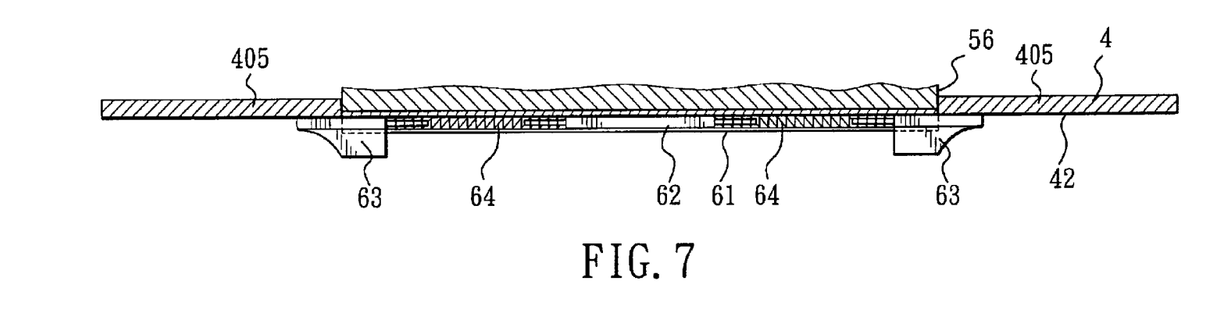
FIG. 7 is a fragmentary sectional view, showing a positioning unit which engages a base member for positioning the support frame at the unfolded state.

Referring to FIGS. 4, 6 and 7, in use, the base member 4 is turned pivotally relative to the stand member 5 in a direction for moving the top surface 41 of the base member 4 toward the front side surface 52 of the stand member 5. Inner edge portions 406 of the first pivot lobes 405 slide past the tapered walls 633 on the engaging blocks 63 and depress the engaging blocks 63 to retract the engaging blocks 63 into the slide channel 610, thereby compressing the biasing springs 64 and thereby permitting extension of the slide rail 61 into the first notch 43. The top surface 41 of the base member 4 eventually abuts against the bottom surface 561 of the abutment projection 56. At this time, the base member 4 reaches an unfolded position relative to the stand member 5. In the unfolded position, the top surface 41 of the base member 4 confronts the front side surface 52 of the stand member 5, and cooperates therewith to form a predetermined angle 201 therebetween. Once the base member 4 moves to the unfolded position, the engaging blocks 63 project once again from the open ends of the slide channel 61 due to the biasing action of the biasing springs 64, and engage the bottom surface 42 of the base member 4. The base member 4 is thus clamped between the engaging blocks 63 and the abutment projection 56, and is thus positioned at the unfolded position, where the LCD unit 900 can be supported stably by the support frame 300.

Figure 8:
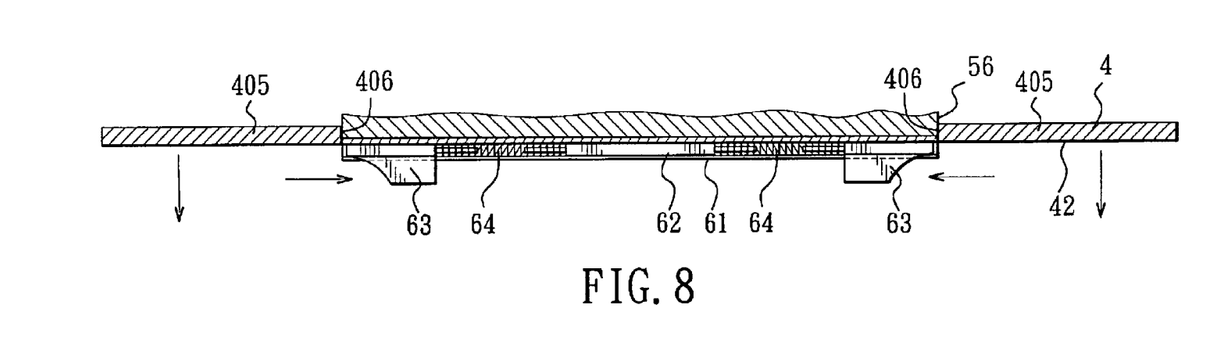
FIG. 8 is a fragmentary sectional view, showing how the positioning unit can be operated for disengaging from the base member.
Figure 9:
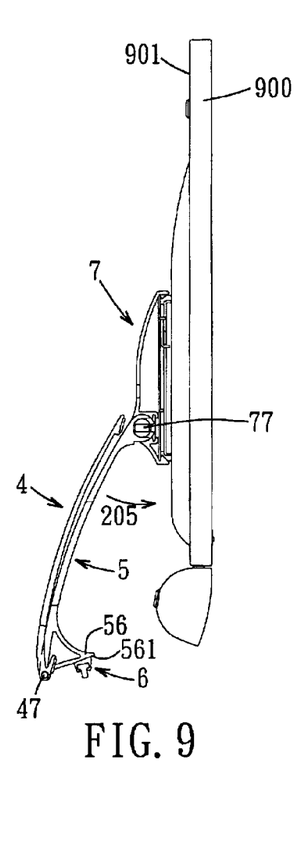
FIG. 9 is another side view, showing the preferred embodiment during folding operation of the support frame.
Figure 10:
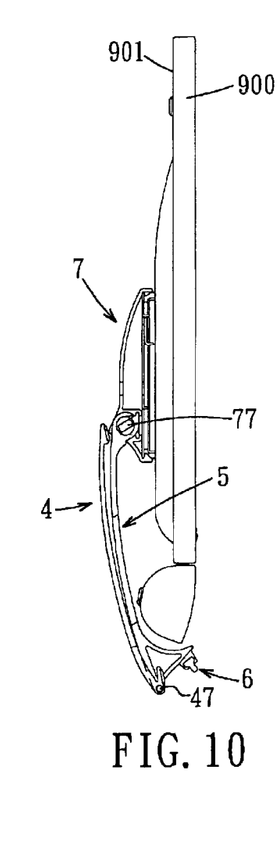
FIG. 10 is another side view of the preferred embodiment, where the support frame is shown to be in a folded state.

Referring to FIGS. 6, 8 and 9, when it is desired to collapse the support frame 300, the engaging blocks 63 are moved for retracting into the slide channel 61 so as to disengage from the base member 4. Then, the base member 4 is turned about the lower pivot axis relative to the stand member 5 in a first direction, shown by arrow 203 in FIG. 6, in which the base member 4 is moved away from the front side surface 52 and is moved proximate to the rear side surface 51 of the stand member 5 so as to be folded on the rear side surface 51 of the stand member 5, as shown in FIG. 9. Thereafter, the stand member 5 is turned forwardly about the upper pivot axis, together with the base member 4 folded thereon, as shown by arrow 205 in FIG. 9, for folding on the LCD unit 900. The LCD assembly is thus converted to be in a compact state shown in FIG. 10 to reduce the required storage space and packaging volume of the assembly, thereby facilitating storage and transport of the same.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A liquid crystal displayer (LCD) assembly comprising:
   a liquid crystal displayer (LCD) unit having a casing with a rear side wall; and
   a support frame for supporting said LCD unit, said support frame including:
   a base member having front and rear ends and top and bottom surfaces;
   an upright stand member having a lower end connected pivotally to said rear end of said base member such that said base member is pivotable relative to said stand member about a horizontal lower pivot axis, said stand member further having an upper end mounted pivotally on said rear side wall of said LCD unit so as to be pivotable about a horizontal upper pivot axis relative to said LCD unit, said stand member having a front side surface and a rear side surface opposite to said front side surface; and
   a positioning unit mounted on said stand member and engaging releasably said base member for positioning said base member at an unfolded position relative to said stand member, said base member and said stand member defining a predetermined angle when said base member is in the unfolded position, said positioning unit being operable for disengaging from said base member so as to permit said base member to turn about the lower pivot axis in a first direction, in which said base member is moved away from said front side surface of said stand member and proximate to said rear side surface of said stand member so as to be folded on said rear side surface of said stand member, said stand member being turnable about said upper pivot axis for moving proximate to said rear side wall of said LCD unit so as to be folded on said LCD unit.

2. The LCD assembly as claimed in claim 1, wherein said base member is in the form of a curved plate, said bottom surface being concave, said stand member including a curved plate portion formed with said front and rear side surfaces, said rear side surface being convex.

3. The LCD assembly as claimed in claim 1, wherein said rear end of said base member is formed with a first notch and a pair of first pivot lobes on opposite sides of said first notch, said lower end of said stand member extending into said first notch, said support frame further including a horizontal pivot axle extending along the lower pivot axis and through said first pivot lobes and said lower end of said stand member for connecting said lower end of said stand member pivotally to said rear end of said base member.

4. The LCD assembly as claimed in claim 3, wherein said stand member has an abutment projection which projects forwardly from said lower end of said stand member, said abutment projection having a bottom surface which abuts against said top surface of said base member when said base member is in the unfolded position, said positioning unit being mounted on said bottom surface of said abutment projection and extending through said first notch, said positioning unit including a resilient engaging unit which engages releasably said bottom surface of said base member such that said base member is clamped between said engaging unit and said abutment projection, thereby positioning said base member at the unfolded position, said engaging unit being operable for disengaging from said bottom surface of said base member so as to permit pivoting movement of said base member relative to said stand member in the first direction.

5. The LCD assembly as claimed in claim 4, wherein said positioning unit includes an elongated slide rail which is secured to said bottom surface of said abutment projection and which is formed with a slide channel with two opposite open ends, said slide rail being extendible into said first notch such that said open ends of said slide channel are disposed respectively adjacent to said first pivot lobes of said base member, said engaging unit including a pair of engaging blocks disposed slidably in said slide channel, and a biasing unit received in said slide channel between said engaging blocks for biasing said engaging blocks to move outwardly of said slide channel such that said engaging blocks project from said open ends of said slide channel and engage said bottom surface of said base member to prevent pivoting movement of said base member in the first direction relative to said stand member for positioning said base member in the unfolded position, said engaging blocks being operable for retracting into said slide channel so as to disengage from said base member, thereby permitting pivoting movement of said base member in the first direction relative to said stand member.

6. The LCD assembly as claimed in claim 1, wherein said upper end of said stand member is formed with a pair of second pivot lobes and a second notch between said second pivot lobes, each of said second pivot lobes being formed with a horizontally extending pin slot, said support frame further including:
- a first mounting plate mounted on said rear side wall of said LCD unit and having a pivot portion which extends into said second notch and which is formed with a pivot groove that extends along said upper pivot axis; and
- a pivot pin unit which extends along said upper pivot axis and which includes two flat sections received fittingly and non-rotatably in said pin slots in said second pivot lobes of said stand member, and a rounded section between said flat sections and received rotatably in said pivot groove for mounting said stand member pivotally on said first mounting plate.

7. The LCD assembly as claimed in claim 6, wherein said pivot groove is aligned with said pin slots, said pivot pin unit including a pair of pivot pins, each of which is formed with said flat section and said rounded section connected to said flat section.

8. The LCD assembly as claimed in claim 6, wherein said rounded section of said pivot pin unit engages frictionally said pivot portion of said first mounting plate for retaining frictionally said stand member at a selected angular position relative to said first mounting plate.

9. The LCD assembly as claimed in claim 6, wherein said first mounting plate has a hooked lower end, and a hooked upper end, said support frame further including:
- a second mounting plate fixed to said rear side wall of said LCD unit, said second mounting plate having a lower end engaging removably said hooked lower end of said first mounting plate and an upper end, said second mounting plate being configured to form a slide groove that extends from said upper end toward said lower end of said second mounting plate and that has a top opening, said second mounting plate being formed with a limiting slot;
- a retaining plate disposed posteriorly of said second mounting plate and having a sliding plate portion extending slidably into said slide groove via said top opening, said retaining plate further having a limiting protrusion which extends into and which engages said limiting slot to limit sliding movement of said retaining plate relative to said second mounting plate along said slide groove, said retaining plate having an upper edge; and
- a biasing member disposed between said retaining plate and said second mounting plate for biasing said retaining plate upwardly so as to enable said upper edge of said retaining plate to engage said hooked upper end of said first mounting plate for mounting said first mounting plate on said second mounting plate, said retaining plate being operable to move downwardly along said slide groove against restoring action of said biasing member for disengaging from said hooked upper end of said first mounting plate so as to permit removal of said first mounting plate from said second mounting plate.

10. The LCD assembly as claimed in claim 9, wherein said biasing member includes a resilient ring disposed below said limiting protrusion, said resilient ring having a lower part retained on said second mounting plate, and an upper part abutting against said limiting protrusion so as to apply an upward biasing force to said retaining plate.

11. A support frame for supporting a liquid crystal displayer (LCD) unit, the LCD unit having a casing with a rear side wall, said support frame comprising:
- a base member having front and rear ends and top and bottom surfaces;
- an upright stand member having a lower end connected pivotally to said rear end of said base member such that said base member is pivotable relative to said stand member about a horizontal lower pivot axis, said stand member further having an upper end adapted to be mounted pivotally on the rear side wall of the LCD unit so as to be pivotable about a horizontal upper pivot axis relative to the LCD unit, said stand member having a front side surface and a rear side surface opposite to said front side surface; and
- a positioning unit mounted on said stand member and engaging releasably said base member for positioning said base member at an unfolded position relative to said stand member, said base member and said stand member defining a predetermined angle when said base member is in the unfolded position, said positioning unit being operable for disengaging from said base member so as to permit said base member to turn about the lower pivot axis in a first direction, in which said base member is moved away from said front side surface of said stand member and proximate to said rear side surface of said stand member so as to be folded on said rear side surface of said stand member, said stand member being turnable about said upper pivot axis for moving proximate to said rear side wall of the LCD unit so as to be folded on the LCD unit.

12. The support frame as claimed in claim 11, wherein said base member is in the form of a curved plate, said bottom surface being concave, said stand member including a curved plate portion formed with said front and rear side surfaces, said rear side surface being convex.

13. The support frame as claimed in claim 11, wherein said rear end of said base member is formed with a first notch and a pair of first pivot lobes on opposite sides of said first notch, said lower end of said stand member extending into said first notch, said support frame further including a horizontal pivot axle extending along the lower pivot axis and through said pivot lobes and said lower end of said stand member for connecting said lower end of said stand member pivotally to said rear end of said base member.

14. The support frame as claimed in claim 13, wherein said stand member has an abutment projection which projects forwardly from said lower end of said stand member, said abutment projection having a bottom surface which abuts against said top side of said base member when said base member is in the unfolded position, said positioning unit being mounted on said bottom surface of said abutment projection and extending through said first notch, said positioning unit including a resilient engaging unit which engages releasably said bottom surface of said base member such that said base member is clamped between said engaging unit and said abutment projection, thereby positioning said base member at the unfolded position, said engaging unit being operable for disengaging from said bottom surface of said base member so as to permit pivoting movement of said base member relative to said stand member in the first direction.

15. The support frame as claimed in claim 14, wherein said positioning unit includes an elongated slide rail which is secured to said bottom surface of said abutment projection and which is formed with a slide channel with two opposite open ends, said slide rail being extendible into said first notch such that said open ends of said slide channel are disposed respectively adjacent to said first pivot lobes of said base member, said engaging unit including a pair of engaging blocks disposed slidably in said slide channel, and a biasing unit received in said slide channel between said engaging blocks for biasing said engaging blocks to move outwardly of said slide channel such that said engaging blocks project from said open ends of said slide channel and engage said bottom surface of said base member to prevent pivoting movement of said base member in the first direction relative to said stand member for positioning said base member in the unfolded position, said engaging members being operable for retracting into said slide channel so as to disengage from said base member, thereby permitting pivoting movement of said base member in the first direction relative to said stand member.

16. The support frame as claimed in claim 11, wherein said upper end of said stand member is formed with a pair of second pivot lobes and a second notch between said second pivot lobes, each of said second pivot lobes being formed with a horizontally extending pin slot, said support frame further comprising:

a first mounting plate adapted to be mounted on the rear side wall of the LCD unit and having a pivot portion which extends into said second notch and which is formed with a pivot groove that extends along said upper pivot axis; and a pivot pin unit which extends along said upper pivot axis and which includes two flat sections received fittingly and non-rotatably in said pin slots in said second pivot lobes of said stand member, and a rounded section between said flat sections and received rotatably in said pivot groove for mounting said stand member pivotally on said first mounting plate.

17. The support frame as claimed in claim 16, wherein said pivot groove is aligned with said pin slots, said pivot pin unit including a pair of pivot pins, each of which is formed with said flat section and said rounded section connected to said flat section.

18. The support frame as claimed in claim 16, wherein said rounded section of said pivot pin unit engages frictionally said pivot portion of said first mounting plate for retaining frictionally said stand member at a selected angular position relative to said first mounting plate.

19. The support frame as claimed in claim 16, wherein said first mounting plate has a hooked lower end, and a hooked upper end, said support frame further comprising:

a second mounting plate adapted to be secured to the rear side wall of the LCD unit, said second mounting plate having a lower end engaging removably said hooked lower end of said first mounting plate and an upper end, said second mounting plate being configured to form a slide groove that extends from said upper end toward said lower end of said second mounting plate and that has a top opening, said second mounting plate being formed with a limiting slot;

a retaining plate disposed posteriorly of said second mounting plate and having a sliding plate portion extending slidably into said slide groove via said top opening, said retaining plate further having a limiting protrusion which extends into and which engages said limiting slot to limit sliding movement of said retaining plate relative to said second mounting plate along said slide groove, said retaining plate having an upper edge; and a biasing member disposed between said retaining plate and said second mounting plate for biasing said retaining plate upwardly so as to enable said upper edge of said retaining plate to engage said hooked upper end of said first mounting plate for mounting said first mounting plate on said second mounting plate, said retaining plate being operable to move downwardly along said slide groove against restoring action of said biasing member for disengaging from said hooked upper end of said first mounting plate so as to permit removal of said first mounting plate from said second mounting plate.

20. The support frame as claimed in claim 19, wherein said biasing member includes a resilient ring disposed below said limiting protrusion, said resilient ring having a lower part retained on said second mounting plate, and an upper part abutting against said limiting protrusion so as to apply an upward biasing force to said retaining plate.

* * * * *